United States Patent
Kim et al.

(10) Patent No.: US 11,136,455 B2
(45) Date of Patent: Oct. 5, 2021

(54) RESIN COMPOSITION AND MOLDED PRODUCT MANUFACTURED THEREFROM

(71) Applicant: Lotte Advanced Materials Co., Ltd., Yeosu-si (KR)

(72) Inventors: Myeonghwan Kim, Uiwang-si (KR); Seungshik Shin, Uiwang-si (KR); Hyukjin Jung, Uiwang-si (KR)

(73) Assignee: Lotte Advanced Materials Co., Ltd., Yeosu-si (KR)

(*) Notice: Subject to any disclaimer, the term of this patent is extended or adjusted under 35 U.S.C. 154(b) by 166 days.

(21) Appl. No.: 16/469,898

(22) PCT Filed: Nov. 21, 2017

(86) PCT No.: PCT/KR2017/013294
§ 371 (c)(1),
(2) Date: Jun. 14, 2019

(87) PCT Pub. No.: WO2018/117438
PCT Pub. Date: Jun. 28, 2018

(65) Prior Publication Data
US 2019/0345327 A1  Nov. 14, 2019

(30) Foreign Application Priority Data
Dec. 21, 2016 (KR) .................. 10-2016-0175872

(51) Int. Cl.
C08L 69/00 (2006.01)

(52) U.S. Cl.
CPC .......... C08L 69/00 (2013.01); *C08L 2201/08* (2013.01); *C08L 2205/025* (2013.01); *C08L 2205/035* (2013.01)

(58) Field of Classification Search
CPC ...................................... C08L 69/00
See application file for complete search history.

(56) References Cited

U.S. PATENT DOCUMENTS

| | | | |
|---|---|---|---|
| 4,902,743 A | 2/1990 | Boutni | |
| 5,369,172 A | 11/1994 | Morgan et al. | |
| 5,994,442 A | 11/1999 | Fujiguchi et al. | |
| 7,411,013 B2 | 8/2008 | Harashina et al. | |
| 7,674,855 B2 | 3/2010 | Seidel et al. | |
| 8,492,463 B2 | 7/2013 | Jung et al. | |
| 2005/0009970 A1 | 1/2005 | Seidel et al. | |
| 2006/0264579 A1 | 11/2006 | Ellington et al. | |
| 2010/0041800 A1 | 2/2010 | Son et al. | |
| 2013/0196130 A1 | 8/2013 | Hufen et al. | |

FOREIGN PATENT DOCUMENTS

| | | |
|---|---|---|
| CN | 1813030 A | 8/2006 |
| CN | 101649093 A | 2/2010 |
| CN | 104788930 A | 7/2015 |
| CN | 105385136 A | 3/2016 |
| JP | 09-310013 A | 12/1997 |
| JP | 3117030 B2 | 12/2000 |
| JP | 4243497 B2 | 3/2009 |
| JP | 4673626 B2 | 4/2011 |
| JP | 2013-001772 A | 1/2013 |
| KR | 10-2006-0028421 A | 3/2006 |
| KR | 10-0810111 B1 | 3/2008 |
| KR | 10-2008-0061813 A | 7/2008 |
| KR | 10-2011-0079517 A | 7/2011 |
| KR | 10-1670550 A | 5/2016 |
| KR | 10-2016-0081830 A | 7/2016 |
| KR | 10-2016-0129963 A | 11/2016 |
| WO | 2018/117438 A1 | 6/2018 |

OTHER PUBLICATIONS

International Search Report in counterpart International Application No. PCT/KR2017/013294 dated Feb. 19, 2019, pp. 1-4.
Extended Search Report in counterpart European Application No. 17884618.4 dated Apr. 20, 2020, pp. 1-5.
Office Action in counterpart Chinese Application No. 201780079495.3 dated Dec. 3, 2020, pp. 1-8.
English-translation of Office Action in counterpart Chinese Application No. 201780079495.3 dated Dec. 3, 2020, pp. 1-7.

*Primary Examiner* — Arrie L Reuther
(74) *Attorney, Agent, or Firm* — Additon, Pendleton & Witherspoon, P.A.

(57) ABSTRACT

Provided are resin composition and a molded product manufactured therefrom. The resin composition includes (A) a polycarbonate resin; (B) a rubber-modified vinyl-based graft copolymer; (C) a rubber-modified vinyl-based copolymer; (D) a vinyl-based copolymer including an epoxy group; and (E) a compound represented by Chemical Formula 1.

$$(R^1)_a(R^2)_b(R^3)_c-Si-(OR^4)_{4-a-b-c} \quad \text{[Chemical Formula 1]}$$

In Chemical Formula 1, each substituent is the same as that defined in the specification.

12 Claims, No Drawings

RESIN COMPOSITION AND MOLDED PRODUCT MANUFACTURED THEREFROM

CROSS-REFERENCE TO RELATED APPLICATIONS

This application claims priority to and the benefit of International Application No. PCT/KR2017/013294, filed Nov. 21, 2017, which published as WO 2018/117438 on Jun. 28, 2018; and Korean Patent Application No. 10-2016-0175872, filed in the Korean Intellectual Property Office on Dec. 21, 2016, the entire disclosure of each of which is incorporated herein by reference.

TECHNICAL FIELD

A resin composition and a molded product manufactured therefrom are disclosed.

BACKGROUND ART

A polycarbonate (PC) resin is a thermoplastic plastic having excellent impact resistance, strength, and lightness but is usually used in a form of an alloy with other polymers due to no good flowability. For example, when an acrylonitrile-butadiene-styrene (ABS) resin is blended with polycarbonate, a resin composition maintaining impact resistance of the polycarbonate and having improved process characteristics may be provided with a relatively low cost. Accordingly, the PC/ABS resin is a thermoplastic material widely used as an engineering plastic in various fields covering an interior/exterior material of electric/electronic appliance, industrial parts, everyday miscellaneous things, and a material for a car.

Recently, as an environmentally-friendly design of a plastic product has been emphasized and thus gradually lightened and thinned due to environment and energy issues, a demand on a novel material simultaneously realizing high impact strength, high flowability, and thin film flame retardancy properties which are hardly realized by these PC/ABS resin products is being increased. In addition, a demand on a highly heat resistant and flame retardant plastic material enduring an exothermic stress generated around some mechanical driving units according to accelerating an operation of the mechanical driving units is also continuously being increased.

DISCLOSURE

Technical Problem

An embodiment provides a resin composition having improved flowability, impact resistance, heat resistance, and hydrolysis resistance.

Another embodiment provides a molded product manufactured from the resin composition.

Technical Solution

In an embodiment, resin composition includes (A) a polycarbonate resin; (B) a rubber-modified vinyl-based graft copolymer; (C) a rubber-modified vinyl-based copolymer; (D) a vinyl-based copolymer including an epoxy group; and (E) a compound represented by Chemical Formula 1:

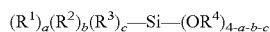

[Chemical Formula 1]

In Chemical Formula 1, $R^1$ to $R^3$ are independently selected from hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a monovalent organic group substituted with an epoxy group, or a combination thereof, at least one of $R^1$ to $R^3$ is a monovalent organic group substituted with an epoxy group, $R^4$ is selected from a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or combination thereof, and $1 \leq a+b+c < 4$.

The rubber-modified vinyl-based graft copolymer (B) and the rubber-modified vinyl-based copolymer (C) may be included in a weight ratio of 1:1 to 1:15. The rubber-modified vinyl-based graft copolymer (B) may include an aromatic vinyl-based monomer and a monomer copolymerizable with the aromatic vinyl-based monomer which are grafted on a rubber polymer.

The rubber-modified vinyl-based copolymer (C) may include a copolymer including a vinyl-based polymer occluded inside the rubber-phase particle.

The rubber-modified vinyl-based copolymer (C) may be prepared using continuous bulk polymerization, continuous solution polymerization, or a combination thereof The vinyl-based polymer may include an aromatic vinyl-based polymer, a vinyl cyanide-based polymer, copolymer of an aromatic vinyl-based monomer and a vinyl cyanide-based monomer, or a combination thereof.

The vinyl-based copolymer including the epoxy group (D) may be a copolymer of (meth)acrylate including an epoxy group, an aromatic vinyl-based monomer, and a monomer copolymerizable with the aromatic vinyl-based monomer.

In Chemical Formula 1, the monovalent organic group substituted with the epoxy group may be an epoxy group, a C1 to C30 alkyl group substituted with an epoxy group, a C3 to C30 cycloalkyl group substituted with an epoxy group, a glycidoxy group, a C1 to C30 alkyl group substituted with a glycidoxy group, or a C3 to C30 cycloalkyl group substituted with a glycidoxy group.

$R^4$ of Chemical Formula 1 may be a substituted or unsubstituted C1 to C10 alkyl group and a+b+c may be 1.

The compound represented by the above Chemical Formula 1 (E) may be included in an amount of less than 1 wt % based on a total amount of the resin composition.

The resin composition may further include (F) a phosphorus-based flame retardant and (G) a fluoro-based polymer.

The fluoro-based polymer (G) may include a styrene-acrylonitrile copolymer, an acrylonitrile-butadiene-styrene copolymer, an alpha-alkyl-styrene-acrylonitrile copolymer, methyl methacrylate, a styrene-butadiene rubber, or a combination thereof.

According to another embodiment, a molded product manufactured from the resin composition is provided.

Advantageous Effects

The resin composition according to an embodiment have improved property balance of mechanical strengths, heat resistances, impact resistances, thermal stability, and appearance characteristics, and the like, particularly improved hydrolysis resistance.

MODE FOR INVENTION

Hereinafter, embodiments of the present invention are described in detail. However, these embodiments are exemplary, the present invention is not limited thereto and the present disclosure is defined by the scope of claims.

In the present specification, when specific definition is not otherwise provided, "alkyl group" refers to a C1 to C20 alkyl group, "alkenyl group" refers to a C2 to C20 alkenyl group, "cycloalkenyl group" refers to a C3 to C20 cycloalkenyl group, "heterocycloalkenyl group" refers to a C3 to C20 heterocycloalkenyl group, "aryl group" refers to a C6 to C20 aryl group, "arylalkyl group" refers to a C6 to C20 arylalkyl group, "alkylene group" refers to a C1 to C20 alkylene group, "arylene group" refers to a C6 to C20 arylene group, "alkylarylene group" refers to a C6 to C20 alkylarylene group, "heteroarylene group" refers to a C3 to C20 heteroarylene group, and "alkoxylene group" refers to a C1 to C20 alkoxylene group.

In the present specification, when specific definition is not otherwise provided, "substituted" refers to replacement of at least one hydrogen by a substituent of a halogen atom (F, Cl, Br, or I), a hydroxy group, a C1 to C20 alkoxy group, a nitro group, a cyano group, an amine group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C20 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C20 heteroaryl group, or a combination thereof.

In the present specification, when specific definition is not otherwise provided, "hetero" refers to inclusion of at least one heteroatom of N, O, S and P in a chemical formula.

In the present specification, when specific definition is not otherwise provided, the term "combination" refers to mixing or copolymerization.

Hereinafter, resin composition according to an embodiment is described.

A resin composition according to an embodiment of the present invention includes (A) a polycarbonate resin; (B) a rubber-modified vinyl-based graft copolymer; (C) a rubber-modified vinyl-based copolymer; (D) a vinyl-based copolymer including an epoxy group; and (E) a compound represented by Chemical Formula 1:

(R$^1$)$_a$(R$^2$)$_b$(R$^3$)$_c$—Si—(OR$^4$)$_{4-a-b-c}$    [Chemical Formula 1]

In Chemical Formula 1,
R$^1$ to R$^3$ are independently selected from hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a monovalent organic group substituted with an epoxy group, or a combination thereof, at least one of R$^1$ to R$^3$ is a monovalent organic group substituted with an epoxy group, R$^4$ is selected from a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, and 1≤a+b+c<4.

Hereinafter, each component of the resin composition is described in more detail.

(A) Polycarbonate Resin

A polycarbonate resin according to an embodiment may be prepared by reacting diphenols represented by Chemical Formula 2 with phosgene, halogenic acid ester, carbonate ester, or a combination thereof.

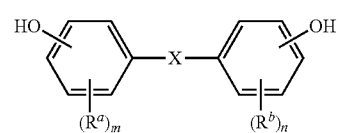

[Chemical Formula 2]

In Chemical Formula 2,
X is selected from a single bond, a substituted or unsubstituted C1 to C5 alkylene, a substituted or unsubstituted C1 to C5 alkylidene, a substituted or unsubstituted C3 to C6 cycloalkylene, a substituted or unsubstituted C5 to C6 cycloalkylidene, —CO, S, and SO$_2$, R$^a$ and R$^b$ are independently, a substituted or unsubstituted C1 to C30 alkyl group or a substituted or unsubstituted C6 to C30 aryl group, and m and n are independently 0 to 4.

For example, two or more types of the diphenols represented by Chemical Formula 2 may be combined to constitute a repeating unit of a polycarbonate resin. For example, the diphenols may be 4,4'-dihydroxydiphenyl, 2,2-bis(4-hydroxyphenyl)propane (referred to as 'bisphenol-A'), 2,4-bis(4-hydroxyphenyl)-2-methylbutane, bis(4-hydroxyphenyl)methane, 1,1-bis(4-hydroxyphenyl)cyclohexane, 2,2-bis(3-chloro-4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, bis(4-hydroxyphenyl)sulfoxide, bis(4-hydroxyphenyl)ketone, bis(4-hydroxyphenyl)ether, and the like. Among the diphenols, for example, 2,2-bis(4-hydroxyphenyl)propane, 2,2-bis(3,5-dichloro-4-hydroxyphenyl)propane or 1,1-bis(4-hydroxyphenyl)cyclohexane may be used. For example, the polycarbonate resin may be 2,2-bis(4-hydroxyphenyl)propane that is bisphenol-A.

For example, the polycarbonate resin may be a linear polycarbonate resin, branched polycarbonate resin, or a polyestercarbonate copolymer resin.

The polycarbonate resin according to an embodiment may include at least two types of polycarbonate resins having a different weight average molecular weight (Mw) in order to satisfy desired flowability. For example, the weight average molecular weight of the polycarbonate resin may be 10,000 to 200,000 g/mol, for example, 15,000 to 80,000 g/mol, but is not limited thereto.

The polycarbonate resin according to an embodiment may be included in an amount of 50 wt % to 90 wt %, for example, 60 wt % to 80 wt % based on a total amount of the resin composition. When the polycarbonate resin is included within the ranges, resin composition having improved property balance of impact strength, heat resistance, and the like may be provided.

(B) Rubber-Modified Vinyl-Based Graft Copolymer

The (B) rubber-modified vinyl-based graft copolymer may be a rubber polymer selected from a butadiene rubber, a styrene/butadiene rubber, an acrylonitrile/butadiene rubber, an isoprene rubber, an ethylene/propylene rubber, an ethylene-propylene-diene terpolymer (EPDM) rubber, and a polyorganosiloxane/polyalkyl(meth)acrylate rubber which is grafted with an aromatic vinyl-based monomer and a monomer copolymerizable with the aromatic vinyl-based monomer.

For example, an amount of the rubbery polymer may be 5 to 65 wt %, for example 10 to 60 wt %, or specifically 20 to 50 wt % based on a total weight (100 wt %) of the rubber-modified vinyl-based graft copolymer. When the rubbery polymer satisfies the amount ranges, impact resistance, mechanical properties, and the like of the resin composition may be improved.

An average particle diameter of the rubbery polymer may range from 0.1 to 10 μm in order to improve impact resistance and surface characteristics of a molded article using the same. For example, the average particle diameter of the rubbery polymer may range from 0.15 to 6 μm, for example, 0.15 to 4 μm, or for example, 0.25 to 3.5 μm. Within the ranges, the resin composition may ensure excellent impact strength.

The aromatic vinyl-based monomer may be graft-copolymerized on the rubbery copolymer and may be for example, styrene, styrene substituted with a C1 to C10 alkyl group, halogen substituted styrene, or a combination thereof. For example, the aromatic vinyl-based monomer may be o-ethyl styrene, m-ethyl styrene, p-ethyl styrene, α-methyl styrene, and the like, but is not limited thereto, and may be used alone or in a mixture of two or more.

An amount of the aromatic vinyl-based monomer may be 15 to 94 wt %, for example, 20 to 80 wt %, or for example, 30 to 60 wt % based on a total weight of the rubber-modified vinyl-based graft copolymer resin (B). When the aromatic vinyl-based monomer satisfies the amount ranges, impact resistance, mechanical properties, and the like may be improved.

The monomer copolymerizable with the aromatic vinyl-based monomer may be for example a vinyl cyanide-based monomer such as acrylonitrile, methacrylonitrile, ethacrylonitrile, phenylacrylonitrile, α-chloroacrylonitrile, fumaronitrile, and the like, and may be used alone or in a mixture of two or more.

An amount of the vinyl cyanide-based monomer may be 1 to 20 wt %, for example 5 to 15 wt % based on a total weight of the rubber-modified vinyl-based graft copolymer resin (B). When the vinyl cyanide-based monomer is included within the ranges, excellent impact resistance and heat resistance may be obtained.

The rubber-modified vinyl-based graft copolymer according to an embodiment may be prepared by a polymerization method of emulsion polymerization, suspension polymerization, bulk polymerization, or a combination thereof.

For example, the rubber-modified vinyl-based graft copolymer prepared by the above method may be an acrylonitrile-butadiene-styrene (ABS) graft copolymer.

An amount of the rubber-modified vinyl-based graft copolymer (B) may be 1 to 5 wt %, for example, 1 to 7 wt %, for example, or 1 to 3 wt % based on a total amount of the resin composition. The resin composition including the rubber-modified vinyl-based graft copolymer within the ranges exhibits excellent impact resistance and heat resistance.

(C) Rubber-Modified Vinyl-Based Copolymer

The rubber-modified vinyl-based copolymer (C) may include a copolymer including a vinyl-based polymer occluded inside the rubber-phase particle. For example, the rubber-modified vinyl-based copolymer may include 5 to 30 wt % of the rubber-phase particle and 70 to 95 wt % of the vinyl-based polymer.

For example, the rubber-modified vinyl-based copolymer (C) may include a rubber-phase particle in a dispersion phase.

The rubber-phase particle may be a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM) rubber, a polyorganosiloxane/polyalkyl(meth)acrylate rubber composite, or a combination thereof.

The rubber-phase particle may have an average particle diameter of 0.5 to 10 μm. For example, the rubber polymer may have an average particle diameter of 0.6 to 5 μm.

The vinyl-based polymer may include an aromatic vinyl-based monomer, a vinyl cyanide-based monomer, a copolymer of an aromatic vinyl-based monomer and a vinyl cyanide-based monomer, or a combination thereof. For example, the copolymer of the aromatic vinyl-based monomer and the vinyl cyanide-based monomer may be used and may include 60 to 90 wt % of the aromatic vinyl-based monomer and 10 to 40 wt % of the vinyl cyanide-based monomer.

The aromatic vinyl-based monomer may be styrene, styrene substituted with a C1 to C10 alkyl group, halogen-substituted styrene, or a combination thereof. For example, the aromatic vinyl-based monomer may be o-ethyl styrene, m-ethyl styrene, p-ethyl styrene, α-methyl styrene, and the like, but is not limited thereto. These may be used alone or in a mixture of two or more.

The vinyl cyanide-based monomer may be acrylonitrile, methacrylonitrile, ethacrylonitrile, or a combination thereof.

For example, the vinyl cyanide-based monomer may be included in an amount of 5 to 40 wt %, for example, 10 to 25 wt % based on a total amount of the rubber-modified vinyl-based copolymer (C).

For example, the rubber-modified vinyl-based copolymer may be prepared using a continuous bulk polymerization, a continuous solution polymerization, or a combination thereof The rubber-modified vinyl-based copolymer (C) may be included in an amount of 5 to 20 wt %, for example, 5 to 15 wt %, for example, 7 to 10 wt % based on a total amount of the resin composition. When the rubber-modified vinyl-based copolymer is included within the range, excellent impact resistance and heat resistance may be obtained.

The rubber-modified vinyl-based graft copolymer (B) and the rubber-modified vinyl-based copolymer (C) may be included in a weight ratio of 1:1 to 1:15, for example, 1:3 to 1:15, for example, 1:3 to 1:10, for example, 1:5 to 1:10. For example, the rubber-modified vinyl-based graft copolymer (B) and the rubber-modified vinyl-based copolymer (C) may be mixed in a weight ratio of 1:10. When included within the weight ratio range, a resin composition having excellent impact resistance may be provided, and in addition, the resin composition may secure excellent molding processability due to improved flowability.

(D) Vinyl-Based Copolymer Including Epoxy Group

The vinyl-based copolymer including the epoxy group (D) may be a copolymer of (meth)acrylate including an epoxy group, an aromatic vinyl-based polymer, and a monomer copolymerizable with the aromatic vinyl-based monomer.

The (meth)acrylate including the epoxy group may be glycidyl methacrylate, glycidyl acrylate, and the like, but is not limited thereto. It may be used alone or as a mixture of two or more.

For example, an amount of the (meth)acrylate including the epoxy group may be 0.01 to 10 wt %, for example 0.05 to 5 wt % based on a total weight of the vinyl-based copolymer including the epoxy group (D).

The vinyl-based copolymer including the epoxy group may improve miscibility between the polycarbonate resin and the rubber-modified vinyl-based graft copolymer and the rubber-modified vinyl-based copolymer. For example, the rubber-modified aromatic vinyl-based graft copolymer and the like may be uniformly dispersed as a small size in the poly carbonate resin, and an effect of improving properties of each component included in the resin composition may be maximized.

The aromatic vinyl-based monomer styrene, styrene substituted with a C1 to C10 alkyl group, halogen-substituted styrene, or a combination thereof. For example, the aromatic vinyl-based monomer may be o-ethyl styrene, m-ethyl styrene, p-ethyl styrene, α-methyl styrene, and the like, but is not limited thereto. These may be used alone or in a mixture of two or more. For example, the aromatic vinyl-based monomer may be included in an amount of 20 to 90 wt %, for example, 30 to 60 wt % based on a total amount of the vinyl-based copolymer including the epoxy group. Within the range, excellent miscibility among the components of the resin composition may be secured.

The monomer copolymerizable with the aromatic vinyl-based monomer may be for example a vinyl cyanide-based compound such as acrylonitrile, methacrylonitrile, ethacrylonitrile, phenylacrylonitrile, α-chloroacrylonitrile, fumaronitrile, and the like, and may be used alone or in a mixture of two or more. The monomer copolymerizable with the aromatic vinyl-based monomer may be used in an amount of 5 to 70 wt %, for example, 10 to 50 wt % based on a total amount of the vinyl-based copolymer including the epoxy group. Within the range, excellent miscibility among the components of the resin composition may be secured.

For example, the vinyl-based copolymer including the epoxy group may be a styrene-acrylonitrile-glycidyl methacrylate copolymer.

The vinyl-based copolymer including the epoxy group (D) may be included in an amount of 0.1 to 10 wt %, for example, 0.5 to 10 wt %, for example, 0.5 to 7 wt %, or for example, 1 to 5 wt % based on a total amount of the resin composition. When the vinyl-based copolymer including the epoxy group is included within the amount range, excellent miscibility among the components of the resin compositions may be secured.

(E) Silane Compound Including Epoxy Group

The resin composition according to an embodiment includes a silane compound including an epoxy group, that is, a compound represented by Chemical Formula 1.

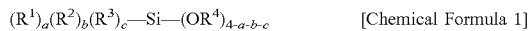
[Chemical Formula 1]

In Chemical Formula 1, $R^1$ to $R^3$ are independently selected from hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a monovalent organic group substituted with an epoxy group, or a combination thereof, at least one of $R^1$ to $R^3$ is a monovalent organic group substituted with an epoxy group, $R^4$ is selected from a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or a combination thereof, and $1 \leq a+b+c < 4$.

The silane compound substituted with an epoxy group may be included in the resin composition according to an embodiment and thus maximize hydrolysis resistance of the resin composition. Specifically, since the silane compound substituted with an epoxy group works as a hydrolysis initiator of the polycarbonate, a hydrolysis reaction in the silane compound proceeds faster than that of the polycarbonate resin. Resultantly, hydrolysis resistance characteristics of the polycarbonate resin are improved.

For example, the monovalent organic group substituted with the epoxy group of Chemical Formula 1 may be epoxy group, a C1 to C30 alkyl group substituted with an epoxy group, a C3 to C30 cycloalkyl group substituted with an epoxy group, a glycidoxy group, a C1 to C30 alkyl group substituted with a glycidoxy group, or a C3 to C30 cycloalkyl group substituted with a glycidoxy group. For example, the monovalent organic group substituted with an epoxy group may be the C1 to C30 alkyl group substituted with the glycidoxy group.

For example, $R^4$ of Chemical Formula 1 may be a substituted or unsubstituted C1 to C10 alkyl group and $a+b+c$ may be 1.

The silane compound (E) represented by Chemical Formula 1 may be included in an amount of less than 1 wt % based on a total amount of the resin composition. For example, the silane compound represented by Chemical Formula 1 may be used in an amount of 0.01 to 0.9 wt %, for example, 0.05 to 0.9 wt %, for example, 0.1 to 0.7 wt %, or for example, 0.1 to 0.5 wt %. When the silane compound including the epoxy group is included within the range, a resin composition having optimal impact strength as well as excellent hydrolysis resistance characteristics may be provided.

(F) Phosphorus-Based Flame Retardant

The resin composition according to an embodiment includes the phosphorus-based flame retardant (F). The phosphorus-based flame retardant may be a conventional phosphorus-based flame retardant used in a flame retardant resin composition. For example, the phosphorus-based flame retardant may be a phosphate compound, a phosphonate compound, a phosphinate compound, a phosphine oxide compound, a phosphazene compound, a metal salt thereof, and the like. The phosphorus-based flame retardant may be used alone or in a mixture of two or more.

For example, the phosphorus-based flame retardant may be a phosphoric acid ester compound represented by Chemical Formula 3 or a mixture thereof, but is not limited thereto.

[Chemical Formula 3]
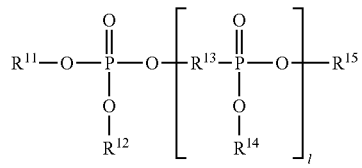

In Chemical Formula 3, $R^{11}$, $R^{12}$, $R^{14}$, and $R^{15}$ are independently hydrogen, a substituted or unsubstituted C6 to C20 aryl group, a substituted or unsubstituted C7 to C30 arylalkyl group, or a combination thereof, $R^{13}$ is a substituted or unsubstituted C6 to C20 arylene group, or a substituted or unsubstituted C7 to C30 arylalkyl group, and l is an integer ranging from 0 to 4.

For example, when n is 0, examples of the phosphoric acid ester compound represented by Chemical Formula 3 may be diphenylphosphate, and the like diarylphosphate, triphenylphosphate, tricresyl phosphate, trixylenylphosphate, tri(2,6-dimethylphenyl)phosphate, tri(2,4,6-trimethylphenyl)phosphate, tri(2,4-ditertiarybutylphenyl)phosphate, tri(2,6-dimethylphenyl)phosphate, and the like, and when n is 1, it may be bisphenol-A bis(diphenylphosphate), resorcinol bis(diphenylphosphate), resorcinol bis[bis(2,6-dimethylphenyl)phosphate], resorcinol bis[bis(2,4-ditertiarybutylphenyl)phosphate], hydroquinone bis[bis(2,6-dimethylphenyl)phosphate], hydroquinone bis[bis(2,4-ditertiarybutylphenyl)phosphate], and the like, but is not limited thereto. In addition, the phosphoric acid ester-based compound may be used alone or in a mixture of two or more.

The phosphorus-based flame retardant (F) may be included in an amount of 1 to 20 wt % based on a total amount of the resin composition. For example, the phosphorus-based flame retardant may be included in an amount of 1 to 18 wt %, for example, 1 to 15 wt %, for example, 3 to 15 wt %, for example, 5 to 10 wt % based on a total amount of the resin composition. The phosphorus-based flame retardant may improve flame retardancy without deteriorating other properties of the resin composition within the ranges.

(G) Fluoro-Based Polymer

The resin composition according to an example embodiment includes a fluoro-based polymer in order to improve flame retardancy.

For example, the fluoro-based polymer may include a styrene-acrylonitrile copolymer, an acrylonitrile-butadiene-styrene copolymer, an alpha-alkyl-styrene-acrylonitrile copolymer, methyl methacrylate, a styrene-butadiene rubber, or a combination thereof. For example, the fluoro-based polymer may be copolymerized with the styrene-acrylonitrile copolymer.

The fluoro-based polymer (G) may be included in an amount of 0.01 to 1 wt % based on a total amount of the resin composition. For example, the fluoro-based polymer (G) may be included in an amount of 0.05 to 1 wt %, for example, 0.1 to 1 wt %, or for example, 0.1 to 0.7 wt % based on a total amount of the resin composition. Within the range of the fluoro-based polymer, flame retardancy of the resin composition may be improved.

In addition, the resin composition according to an embodiment may further include at least one additive out of other additives in order to improve injection molding and balance properties or depending on a final use of the resin composition. Specifically, the other additives may include a surfactant, a nucleating agent, a coupling agent, a filler, a plasticizer, an impact-reinforcing agent, a lubricant, an antibacterial agent, a release agent, an antioxidant, an inorganic material additive, a colorant, an antistatic agent, a pigment, a dye, a flameproofing agent, and the like, which may be used alone or as a mixture of two or more. For example, the resin composition may further include an antioxidant.

According to another embodiment of the present invention, a molded product manufactured from the resin composition is provided. The molded product may be manufactured in various methods publicly known in the related art, for example, a method of injection molding, blow molding, extrusion, and the like by using the resin composition. The molded product includes a large part such as an auto part or an injection molded product having a complex shape but is not limited thereto. For example, the molded product may be manufactured in a form of a film.

The molded product exhibits excellent impact resistance and hydrolysis resistance. For example, the molded product may have Izod impact strength of greater than or equal to 50 kgf·cm/cm, for example, greater than or equal to 55 kgf·cm/cm, or for example, greater than or equal to 60 kgf·cm/cm according to ASTM D256 of a ⅛"-thick specimen.

In addition, the molded product showed a melt index (MI) increase of less than or equal to 200%, for example, less than or equal to 180%, or for example, less than or equal to 160% before and after the aging in a thermohygrostat of 95° C. and 95% for one week

EXAMPLES

Hereinafter, the present invention is illustrated in more detail with reference to examples and comparative examples. However, the following examples and comparative examples are provided for the purpose of descriptions and the present invention is not limited thereto.

The components used for preparing resin compositions in examples and comparative examples are as follows.

(A) Polycarbonate Resin (A-1) Bisphenol-A type polycarbonate resin having a weight average molecular weight of 28,000 g/mol (Manufacturer: Lotte Advanced Materials Co., Ltd. SC-1080)

(A-2) Bisphenol-A type polycarbonate resin having a weight average molecular weight of 23,000 g/mol (Manufacturer: Lotte Advanced Materials Co., Ltd. SC-1190)

(B) Rubber-modified vinyl-based graft copolymer 60 parts by weight of a butadiene rubber having an average particle diameter of 0.31 μm and 40 parts by weight of a vinyl-based polymer consisting of 70 wt % of styrene and 30 wt % of acrylonitrile were used to prepare g-ABS emulsion through a general graft-polymerization method.

(C) Rubber-modified Vinyl-based Copolymer 15 wt % of rubber-phase particles of butadiene having an average particle diameter of 1 μm and 85 wt % of a vinyl-based polymer consisting of 85 wt % of styrene and 15 wt % of acrylonitrile were used to manufacture c-ABS (Manufacturer: Panjin) through a continuous solution polymerization.

(D) Vinyl-based Copolymer including Epoxy Group 100 parts by weight of a monomer mixture of 0.5 mol % of glycidyl methacrylate and 99.5 mol % of a vinyl-based compound consisting of 70 parts by weight of styrene and 30 parts by weight of acrylonitrile, 120 parts by weight of deionized water, 0.2 parts by weight of azobisisobutyronitrile, 0.4 parts by weight of tricalcium phosphate, and 0.2 parts by weight of n-octyl mercaptan were mixed. The obtained mixture was heated up to 80° C. for 60 minutes and then, maintained at 80° C. for 180 minutes to prepare a styrene-acrylonitrile copolymer resin including an epoxy group. The obtained styrene-acrylonitrile copolymer resin including the epoxy group was washed, dehydrated, and dried to manufacture a styrene-acrylonitrile copolymer resin including an epoxy group in a powder state (epoxy-containing SAN).

(E) Silane Compound Including Epoxy Group: gamma-glycidoxypropyl trimethoxysilane (Manufacturer: Crompton, tradename: SILQUEST A-187)

(F) Phosphorus-based Flame Retardant: bisphenol-A diphosphate (Manufacturer: Yoke Chemical)

(G) Fluoro-based Polymer: polytetrafluoroethylene-styrene acrylonitrile (PTFE-SAN) (Manufacturer: Hannanotech)

(H) Antioxidant: octadecyl 3-(3,5-di-t-butyl-4-hydroxyphenyl)propionate

Examples 1 and 2 and Comparative Examples 1 to 6

The aforementioned components were used to have each composition shown in Table 1 to obtain resin compositions according to Examples 1 and 2 and Comparative Examples 1 to 6. As for a manufacturing method, the components were mixed to have each composition in Table 1 and extruded into a pellet by using a general twin screw type extruder. The pellet was dried at 80° C. for greater than or equal to 5 hours and injected with a 240 to 280 screw-type injector (a 150 ton single injector) to manufacture specimens.

TABLE 1

|  |  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| PC | (A-1) | 22 | 22 | 22 | 22 | 22 | 22 | 22 | 22 |
|  | (A-2) | 52 | 52 | 52 | 52 | 52 | 52 | 52 | 52 |
| (B) g-ABS | | 1 | 1 | 6 | 1 | 1 | 1 | 1 | 1 |
| (C) c-ABS | | 10 | 10 | — | 12 | 11 | 10 | 12 | 10 |
| (D) GMA-SAN | | 2 | 2 | — | — | 1 | 2 | — | 2 |
| (E) γ-glycidoxy propyl trimethoxy silane | | 0.3 | 0.5 | — | — | — | — | 0.3 | 1.0 |
| (F) BDP | | 11.5 | 11.5 | 11.5 | 11.5 | 11.5 | 11.5 | 11.5 | 11.5 |
| (G) PTFE-SAN | | 0.4 | 0.4 | 0.4 | 0.4 | 0.4 | 0.4 | 0.4 | 0.4 |
| (H) Antioxidant | | 0.8 | 0.6 | 8.1 | 1.1 | 1.1 | 1.1 | 0.8 | 0.1 |

(unit: wt %)

Evaluation

Properties of the specimens according to Examples 1 to and 2 and Comparative Examples 1 to 6 were evaluated in the following methods, and the results are shown in Table 2.

Heat Resistance (° C.): A Vicat softening temperature was measured according to ASTM D1525. The Vicat softening temperature was measured under a condition of 5 kgf and 50° C./hr according to ISO R306.

(2) Izod Impact Strength (kgf·cm/cm): measured by notching an ⅛"-thick Izod specimen according to ASTM D256.

(3) Melt Flow Index (MI): measured under a condition of 260° C. and 5 kgf according to ASTM D 1238.

(4) Degree of Hydrolysis Resistance (%): obtained by measuring a melt flow index (MI) before and after the aging for one week in a thermohygrostat of 95° C. and 95% and calculating an increase thereof.

(5) Flame Retardancy: measured according to an UL-94 VB flame retardancy regulation by manufacturing a 1.5 mm-thick specimen.

TABLE 2

|  | Ex. 1 | Ex. 2 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| VST (° C.) | 105 | 103 | 104 | 105 | 105 | 105 | 105 | 100 |
| Izod Impact strength (kgf · cm/cm, ⅛") | 60 | 50 | 13 | 75 | 69 | 69 | 60 | 13 |
| melt index (260° C., 5 kg) | 52 | 52 | 51 | 50 | 52 | 53 | 52 | 51 |
| Hydrolysis resistance (%) (95° C./95%, 168 hr) | 200 | 160 | 1,400 | 680 | 630 | 590 | 430 | 120 |
| Flame retardancy (1.5 mmV) | V-0 | V-0 | V-0 | V-0 | V-0 | V-0 | V-0 | V-0 |

As shown in Table 2, the resin compositions according to Examples 1 to and 2 turned out to have excellent heat resistance, impact strength, flame retardancy, and hydrolysis resistance. Particularly, the resin compositions of Examples showed excellent hydrolysis resistance of less than or equal to 200% as well as excellent impact strength.

On the contrary, Comparative Example 5 not including the vinyl-based copolymer including the epoxy group showed hydrolysis resistance of greater than or equal to 400%, and Comparative Example 6 including 1 wt % of the silane compound including the epoxy group showed deteriorated impact resistance.

In addition, Comparative Example 1 not including the rubber-modified vinyl-based copolymer including the vinyl-based polymer occluded inside the rubber-phase particle showed greatly deteriorated impact strength compared with Comparative Example 2 including the same.

In other words, the polycarbonate resin composition according to an embodiment includes the rubber-modified vinyl-based copolymer along with the rubber-modified vinyl-based graft copolymer and thus may maintain properties such as impact resistance and the like and in addition, includes the vinyl-based copolymer including the epoxy group and the silane compound including the epoxy group and represented by Chemical Formula 1 in appropriate amounts and thus may show excellent hydrolysis resistance.

While this invention has been described in connection with what is presently considered to be practical example embodiments, it is to be understood that the invention is not limited to the disclosed embodiments, but on the contrary, it is intended to cover various modifications and equivalent arrangements included within the spirit and scope of the appended claims.

The invention claimed is:

1. A resin composition, comprising:
(A) a polycarbonate resin;
(B) a rubber-modified vinyl-based graft copolymer;
(C) a rubber-modified vinyl-based copolymer;
(D) a vinyl-based copolymer including an epoxy group; and
(E) a compound represented by Chemical Formula 1:

$$(R^1)_a(R^2)_b(R^3)_c\text{—Si—}(OR^4)_{4-a-b-c} \quad \text{[Chemical Formula 1]}$$

wherein, in Chemical Formula 1, $R^1$ to $R^3$ are independently selected from hydrogen, a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, a substituted or unsubstituted C1 to C30 heteroalkyl group, a substituted or unsubstituted C2 to C30 heterocycloalkyl group, a monovalent organic group substituted with an epoxy group, or a combination thereof, with the proviso that at least one of $R^1$ to $R^3$ is a monovalent organic group substituted with an epoxy group, $R^4$ is selected from a substituted or unsubstituted C1 to C30 alkyl group, a substituted or unsubstituted C3 to C30 cycloalkyl group, a substituted or unsubstituted C6 to C30 aryl group, a substituted or unsubstituted C7 to C30 arylalkyl group, or combination thereof, and $1 \leq a+b+c < 4$;

wherein the resin composition comprises the rubber-modified vinyl-based graft copolymer (B) and the rubber-modified vinyl-based copolymer (C) in a weight ratio of 1:3 to 1.15.

2. The resin composition of claim 1, wherein the rubber-modified vinyl-based graft copolymer (B) comprises an aromatic vinyl-based monomer and a monomer copolymerizable with the aromatic vinyl-based monomer which are grafted on a rubber polymer.

3. The resin composition of claim 1, wherein the rubber-modified vinyl-based copolymer (C) comprises a copolymer including a vinyl-based polymer occluded inside a rubber-phase particle.

4. The resin composition of claim 3, wherein the rubber-modified vinyl-based copolymer (C) is prepared by using a continuous bulk polymerization, a continuous solution polymerization, or a combination thereof.

5. The resin composition of claim 3, wherein the vinyl-based polymer comprises an aromatic vinyl-based polymer, a vinyl cyanide-based polymer, a copolymer of an aromatic vinyl-based monomer and a vinyl cyanide-based monomer, or a combination thereof.

6. The resin composition of claim 1, wherein the vinyl-based copolymer including the epoxy group (D) is a copolymer of (meth)acrylate including an epoxy group, an aromatic vinyl-based monomer, and a monomer copolymerizable with the aromatic vinyl-based monomer.

7. The resin composition of claim 1, wherein in Chemical Formula 1, the monovalent organic group substituted with the epoxy group is an epoxy group, a C1 to C30 alkyl group substituted with an epoxy group, a C3 to C30 cycloalkyl group substituted with an epoxy group, a glycidoxy group, a C1 to C30 alkyl group substituted with a glycidoxy group, or a C3 to C30 cycloalkyl group substituted with a glycidoxy group.

8. The resin composition of claim 1, wherein $R^4$ of Chemical Formula 1 is a substituted or unsubstituted C1 to C10 alkyl group and a+b+c is 1.

9. The resin composition of claim 1, comprising the compound represented by Chemical Formula 1 (E) in an amount of less than 1 wt % based on a total amount of the resin composition.

10. The resin composition of claim 1, wherein the resin composition further comprises (F) a phosphorus-based flame retardant and (G) a fluoro-based polymer.

11. The resin composition of claim 10, wherein the fluoro-based polymer (G) comprises a styrene-acrylonitrile copolymer, an acrylonitrile-butadiene-styrene copolymer, an alpha-alkyl-styrene-acrylonitrile copolymer, methyl methacrylate, a styrene-butadiene rubber, or a combination thereof.

12. A molded product manufactured from the resin composition of claim 1.

* * * * *